United States Patent
Liao

(10) Patent No.: US 8,393,633 B2
(45) Date of Patent: Mar. 12, 2013

(54) GOLF BAG CART FOLDABLE DEVICE

(75) Inventor: Gordon Liao, Yung Kang (TW)

(73) Assignee: Unique Product & Design Co., Ltd., Yung Kang (TW)

( * ) Notice: Subject to any disclaimer, the term of this patent is extended or adjusted under 35 U.S.C. 154(b) by 231 days.

(21) Appl. No.: 12/753,959

(22) Filed: Apr. 5, 2010

(65) Prior Publication Data

US 2011/0241315 A1    Oct. 6, 2011

(51) Int. Cl.
  *A63B 55/08*  (2006.01)
(52) U.S. Cl. .................. 280/651; 280/42; 280/DIG. 6
(58) Field of Classification Search .................. 280/651, 280/655, 47.26, 646, 652, 654, 62, DIG. 6, 280/42
See application file for complete search history.

(56) References Cited

U.S. PATENT DOCUMENTS

| | | | | |
|---|---|---|---|---|
| 2,687,894 A | * | 8/1954 | Stoddard | 280/646 |
| 2,782,048 A | * | 2/1957 | Williams et al. | 280/42 |
| 2,914,336 A | * | 11/1959 | Hibben, Jr. et al. | 280/42 |
| 4,784,401 A | * | 11/1988 | Raguet | 280/40 |
| 5,582,419 A | * | 12/1996 | Lucia et al. | 280/42 |
| 5,857,684 A | * | 1/1999 | Liao et al. | 280/40 |
| 6,886,852 B2 | * | 5/2005 | Cheng et al. | 280/651 |
| 7,862,053 B2 | * | 1/2011 | Liao | 280/47.34 |
| 2003/0222428 A1 | * | 12/2003 | Shieh | 280/651 |
| 2010/0090443 A1 | | 4/2010 | Liao | |

* cited by examiner

*Primary Examiner* — J. Allen Shriver, II
*Assistant Examiner* — Bridget Avery
(74) *Attorney, Agent, or Firm* — Alan Kamrath; Kamrath IP Lawfirm, P.A.

(57) ABSTRACT

A golf bag cart foldable device includes a bottom cart stand having a rear wheel frame at each side to link a rear wheel. The bottom cart stand has a bag base to link a front wheel. An upper cart stand is in pinned connection with the bottom cart stand. A linkage set, including plural linkages, forms links between the upper cart stand and the bottom cart stand and between the upper cart stand and the rear wheel frame. A folding joint enables release of the folding joint first. By the link between the linkage set and the rear wheel frame, simultaneous unfolding or folding of the upper cart stand, the bottom cart stand and the rear wheels can thus be accomplished. The folding joint is secured to have the upper cart stand and the bottom cart stand locked to each other, to achieve handiness in use.

8 Claims, 9 Drawing Sheets

US 8,393,633 B2

GOLF BAG CART FOLDABLE DEVICE

BACKGROUND OF THE INVENTION

1. Field of the Invention

This invention relates to a golf bag cart foldable device and, more particularly, to one that features a simultaneous unfolding or folding for its upper cart stand, bottom cart stand and rear wheels, to facilitate the handiness in use.

2. Description of the Prior Art

A prior golf bag cart foldable device, for instance, shown in U.S. Pat. Publication No. 2010-0090443, enables a simultaneous unfolding or folding for its upper cart stand, bottom cart stand and rear wheels. The cart structure includes a slider set up on the bottom cart stand, and the setup of the slider is limited to the stand with a straight tube for its attachment. That constraint deteriorates considerably in the shaping of the appearance of the cart, which apparently calls for necessary improvement.

SUMMARY OF THE INVENTION

The objective of this invention is to provide a golf bag cart foldable device, which features simultaneous unfolding or folding for its upper cart stand, bottom cart stand and rear wheels, to achieve particular handiness in use.

To achieve the aforementioned objective, this invention comprise a bottom cart stand having a link segment at its top. Each side, of the link segment is in pinned connection with a rear wheel frame, to link the corresponding rear wheel. The bottom cart stand has a bag base at its bottom, with the bag base connected to a front wheel frame, to link a front wheel. An upper cart stand is in pinned connection with the link segment of the bottom cart stand through a rotator set up at its bottom. A linkage set includes a plurality of linkages joined to the upper cart stand, bottom cart stand and rear wheels respectively, to form links between the upper cart stand and bottom cart stand and between the upper cart stand and the rear wheel frame. A folding joint, set up on the rotator of the upper cart stand, has a buckle that enables a release of the folding joint first, followed by the turning of the upper cart stand. By the link between the linkage set and the rear wheel frame, unfolding or folding of its upper cart stand, bottom cart stand and rear wheels simultaneously can thus be completed. After that, the folding joint is secured to have the upper cart stand and bottom cart stand locked to each other, for achieving handy operation.

DETAILED DESCRIPTION OF THE INVENTION

Figure 1:
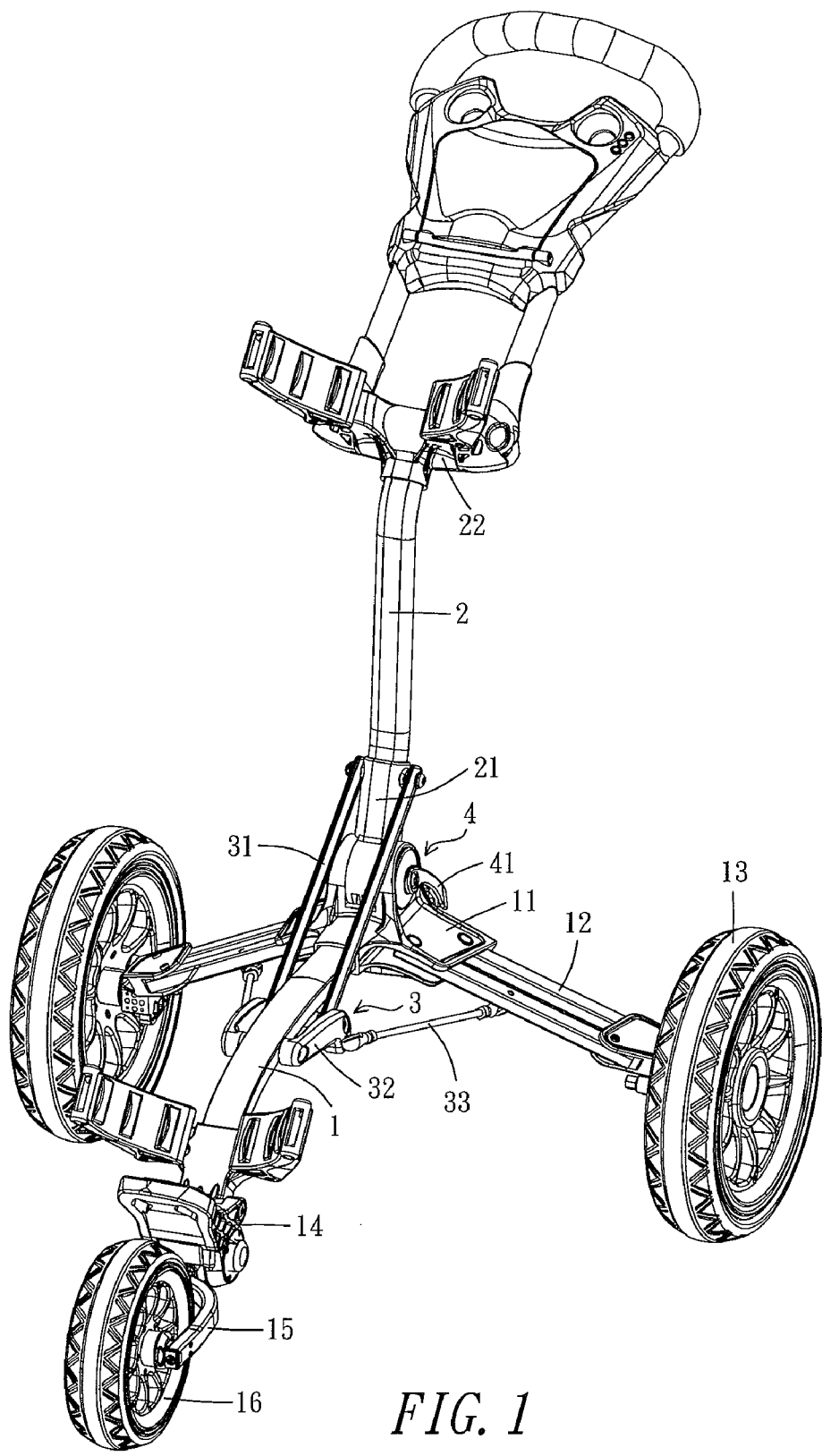
FIG. 1 is a three-dimensional diagram of the unfolding according to the present invention.

The structural traits and the functions of this invention are described in detail with reference to the following preferred embodiment and the accompanying drawings, which would help to comprehend thoroughly the present invention.

Referring to FIGS. 1-5, a bottom cart stand 1 has a link segment 11 at its top, with each side of the link segment 11 in pinned connection with a rear wheel frame 12, which is to link a rear wheel 13. The bottom cart stand 1 has a bag base 14 at its bottom, with the base 14 coupling a front wheel frame 15, which is to link a front wheel 16.

An upper cart stand 2 is in pinned connection with the link segment 11 of the bottom cart stand 1 through a rotator 21 set up at its bottom and is pivotally connected to an upper bracket 22 at its top.

A linkage set 3, made up of a plurality of linkages, is connected to the upper cart stand 2, the bottom cart stand 1 and the rear wheel frames 12 respectively, to form links between the upper cart stand 2 and bottom cart stand 1 and between the upper cart stand 2 and the rear wheel frames 12. The linkage set 3 comprises: a first linkage 31, a second linkage 32 and a third linkage 33. The first linkage 31 couples to the rotator 21 at its top. The second linkage 32 couples to the first linkage 31 on its one end and couples to the bottom cart stand 1 on another end, to form a link between the upper cart stand 2 and bottom cart stand 1. The third linkage 33 is in spherical connection with the second linkage 32 (shown in FIG. 3) on its one end and is coupled to the rear wheel frames 12 on another end, to form a link between the upper cart stand 2 and the rear wheel frames 12.

A folding joint 4, set up on the rotator 21 of the upper cart stand 2, includes a buckle 41 in pinned connection with both sides of the link segment 11 and the rotator 21 and having bulges 411 on the inner sides of its both ends. Two movable tooth disks 42, coupling to somewhere between the rotator 21 and the buckle 41, have outer sides (the end sides that match the buckle 41) each provided with positioning curved trenches 421, which accommodate the corresponding bulges 411 of the buckle 41, to cause a mutual relation of the limit of the angle and movement. Two rotator tooth disks 211, set up at the outer sides of the bottom of the rotator 21, correspond to the respective movable tooth disks 42. The rotator tooth disk 211 and the rotator 21 can be shaped into a single piece. Two springs 43, set up somewhere in between the rotator 21 (also the rotator tooth disk 211) and the movable tooth disk 42, give rise to a force to push the movable tooth disks 42 outward. Once the buckle 41 is pressed down and by the lodgment of the bulges 411 in the positioning curved trenches 421, the movable tooth disks 42 are pushed inward and joined tightly to the rotator tooth disk 211 mutually, the rotator 21 is set to be fixed, and the included angle formed by the upper cart stand 2 and bottom cart stand 1 is then locked. On the contrary, once the buckle 41 is lifted up, the movable tooth disk 42 is pushed outward by the resilience of the spring 43, to enable the disk 42 to separate from the rotator tooth disk 211, which makes the rotator 21 free to rotate.

Figure 2:
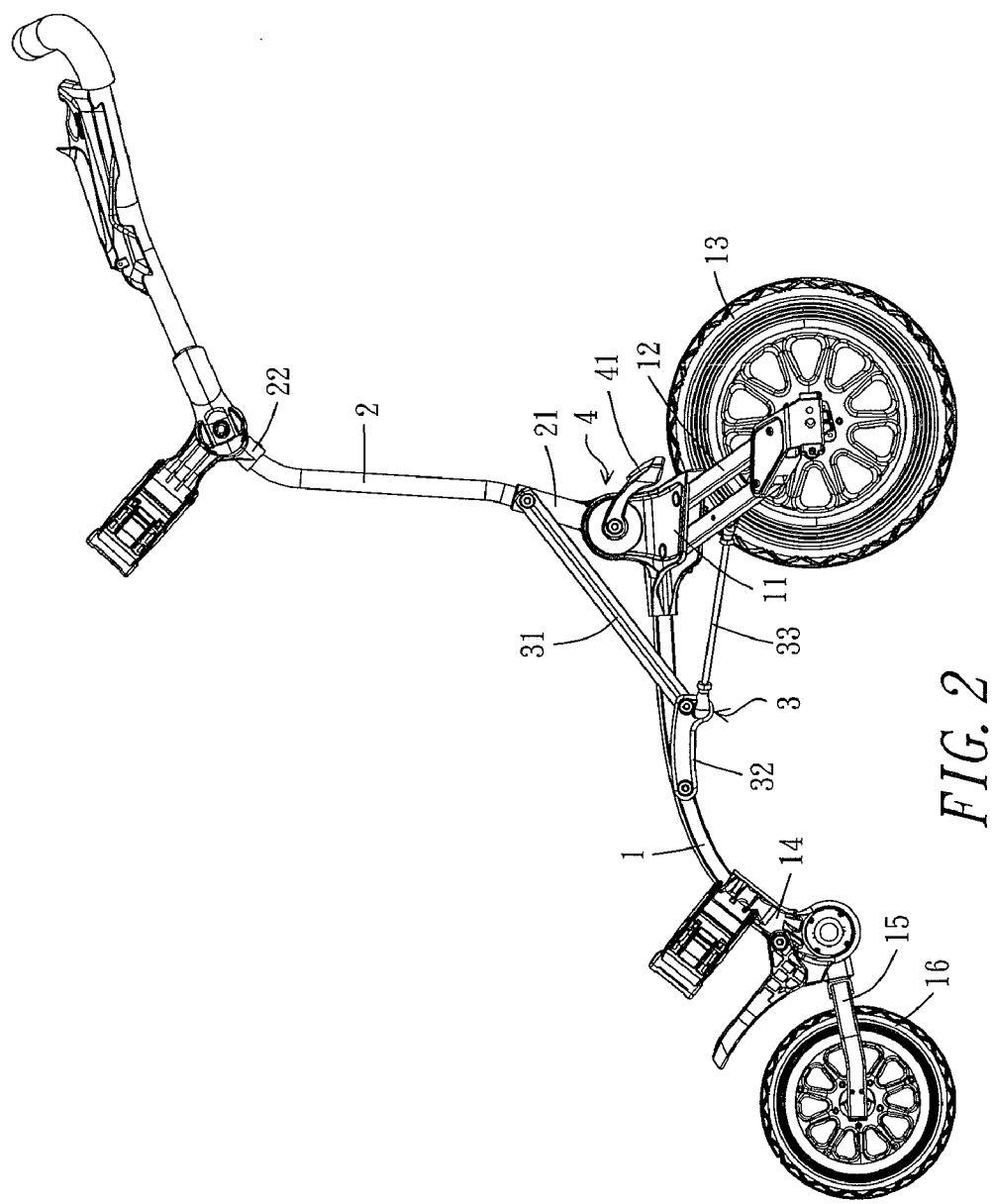
FIG. 2 is a side view of the unfolding according to the present invention.
Figure 3:
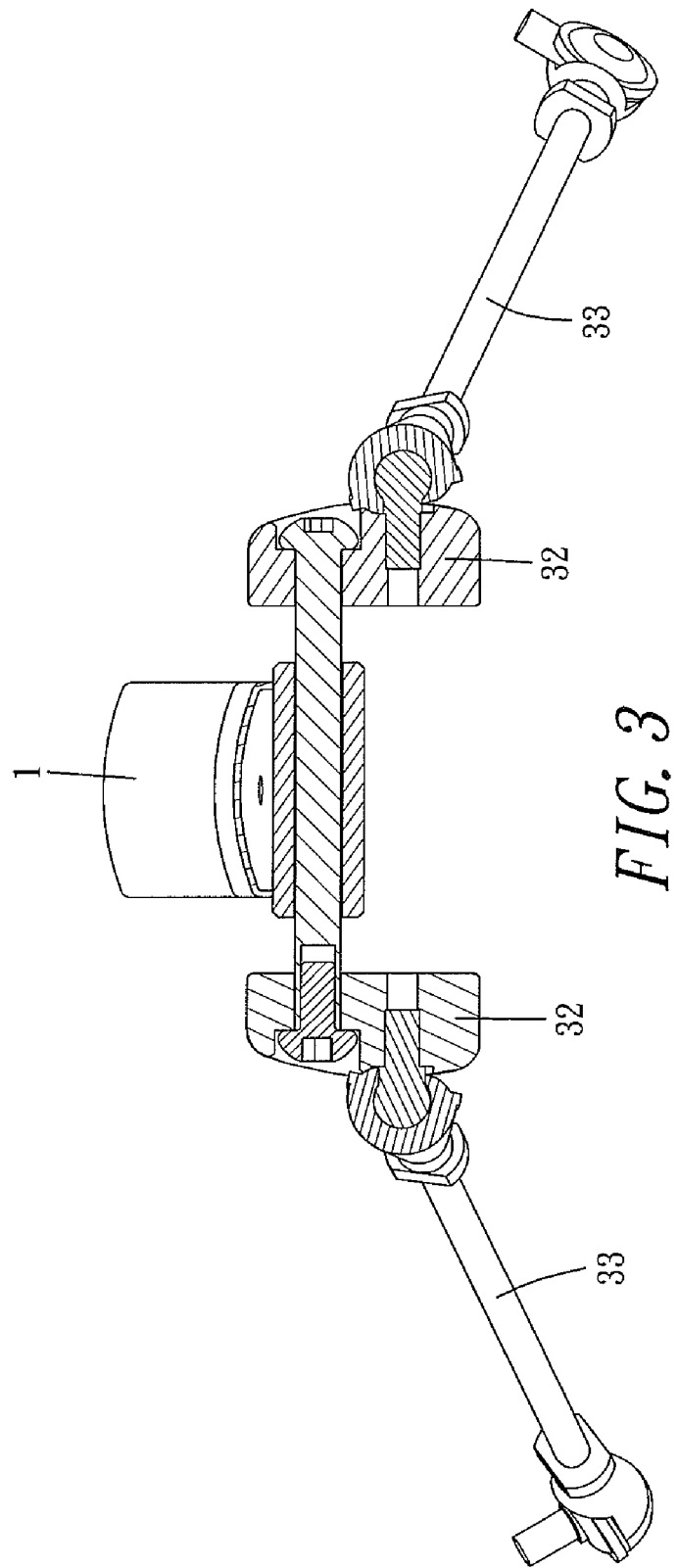
FIG. 3 is a schematic sectional view for the third linkage of the unfolding according to the present invention.
Figure 4:
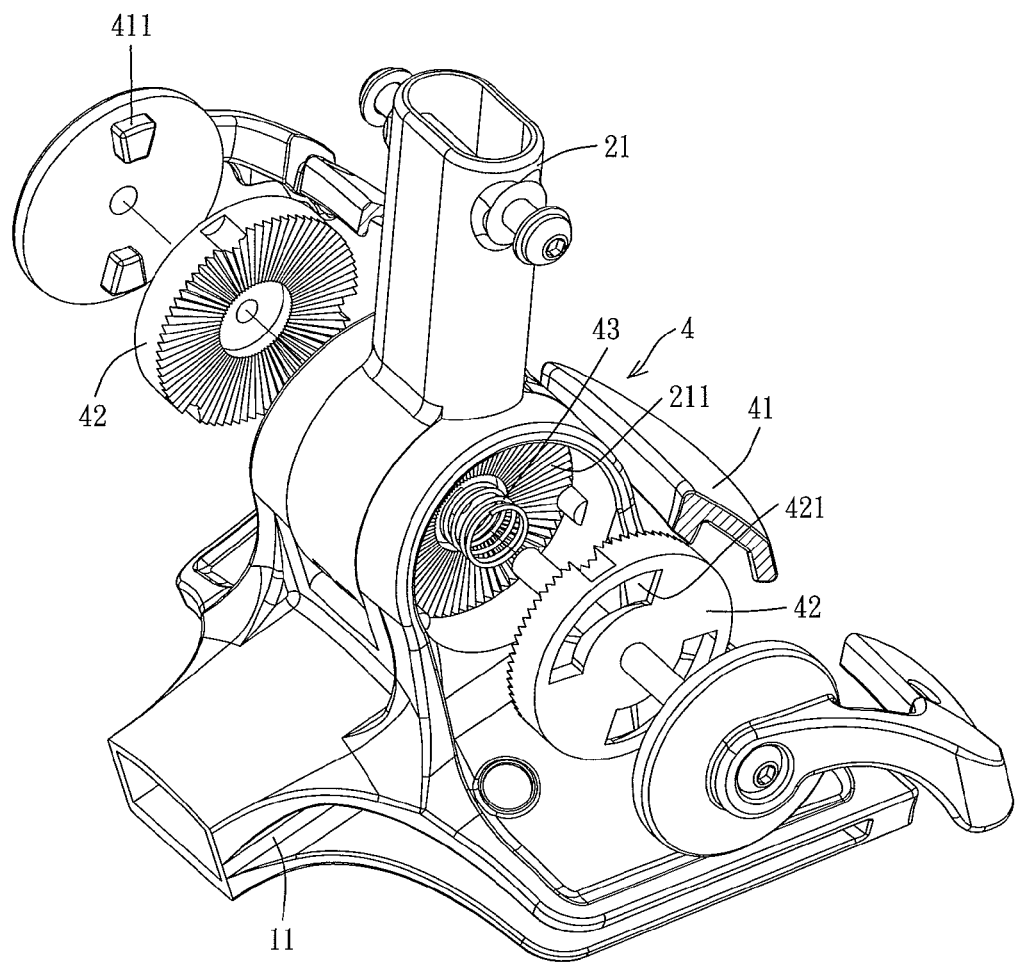
FIG. 4 is a three-dimensional exploded view of the folding joint according to the present invention.
Figure 5:
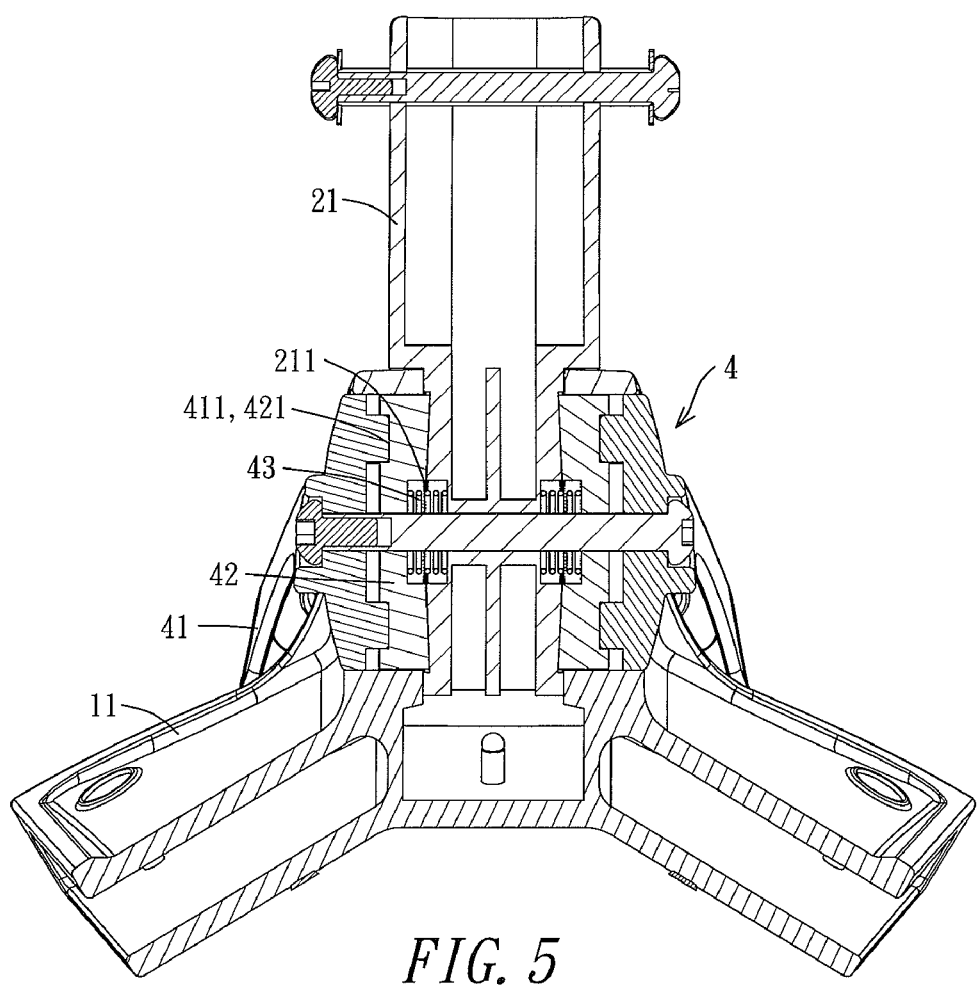
FIG. 5 is a schematic sectional view at the securing of the folding joint according to the present invention.

According to the aforementioned structural combination, the golf bag cart of this invention exhibits an unfolding state under normal conditions, shown in FIGS. 2 & 5, and the buckle 41 presents a pressed-down state at the moment, which helps to lock the relative positions of the upper cart stand 2 and the bottom cart stand 1. Then, the rear wheel frame 12 is simultaneously unfolded for fixing, subject to the interaction among the first linkage 31, the second linkage 32 and the third linkage 33. There is no need for additional joints to be fixed.

Figure 6:
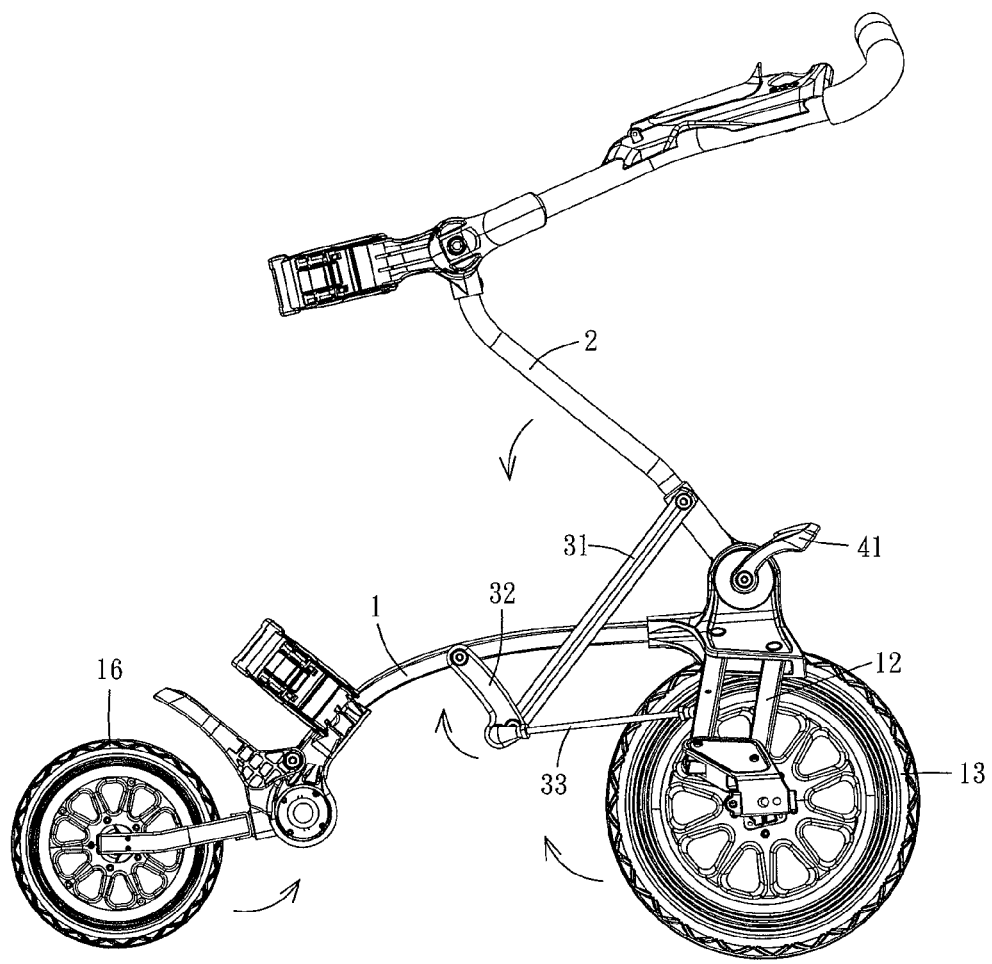
FIG. 6 is a schematic diagram of the side elevation of the motions of the folding according to the present invention.
Figure 7:
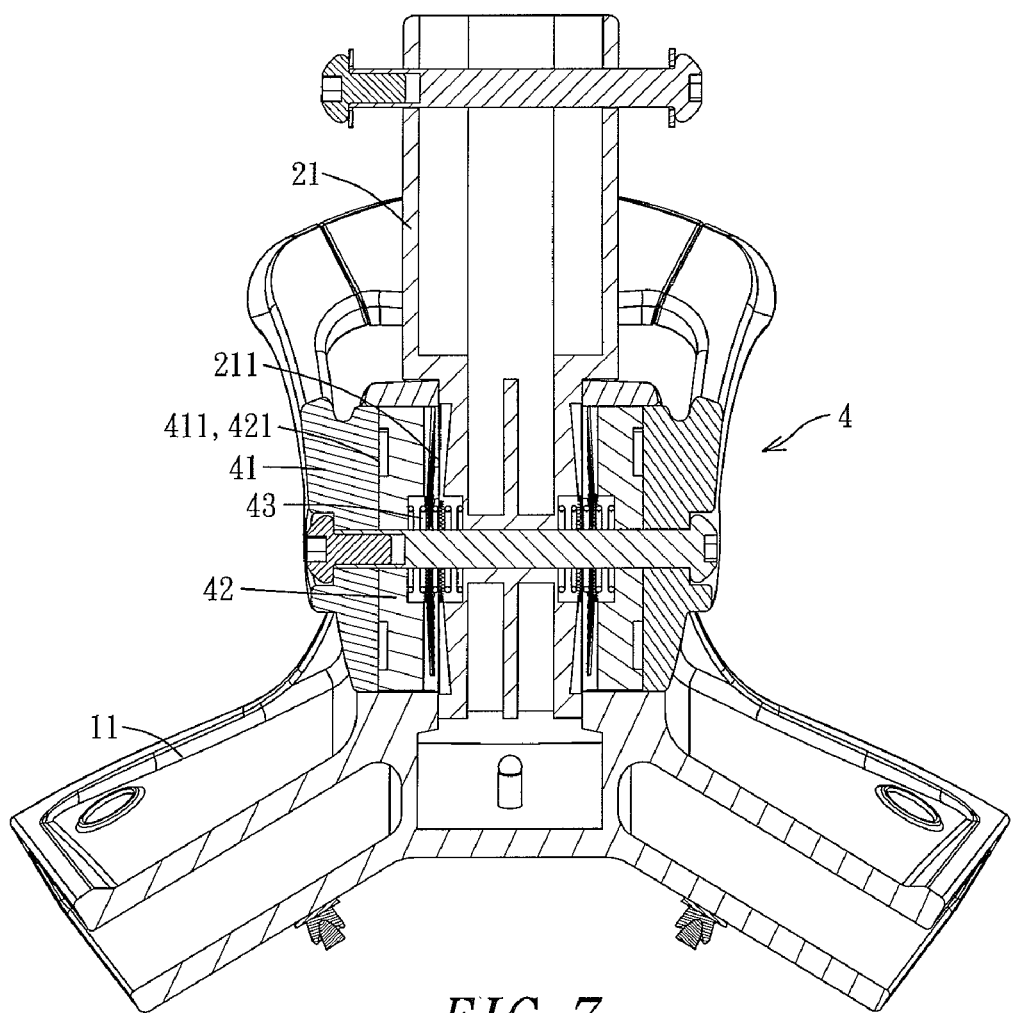
FIG. 7 is a schematic sectional view at the release of the folding joint according to the present invention.
Figure 8:
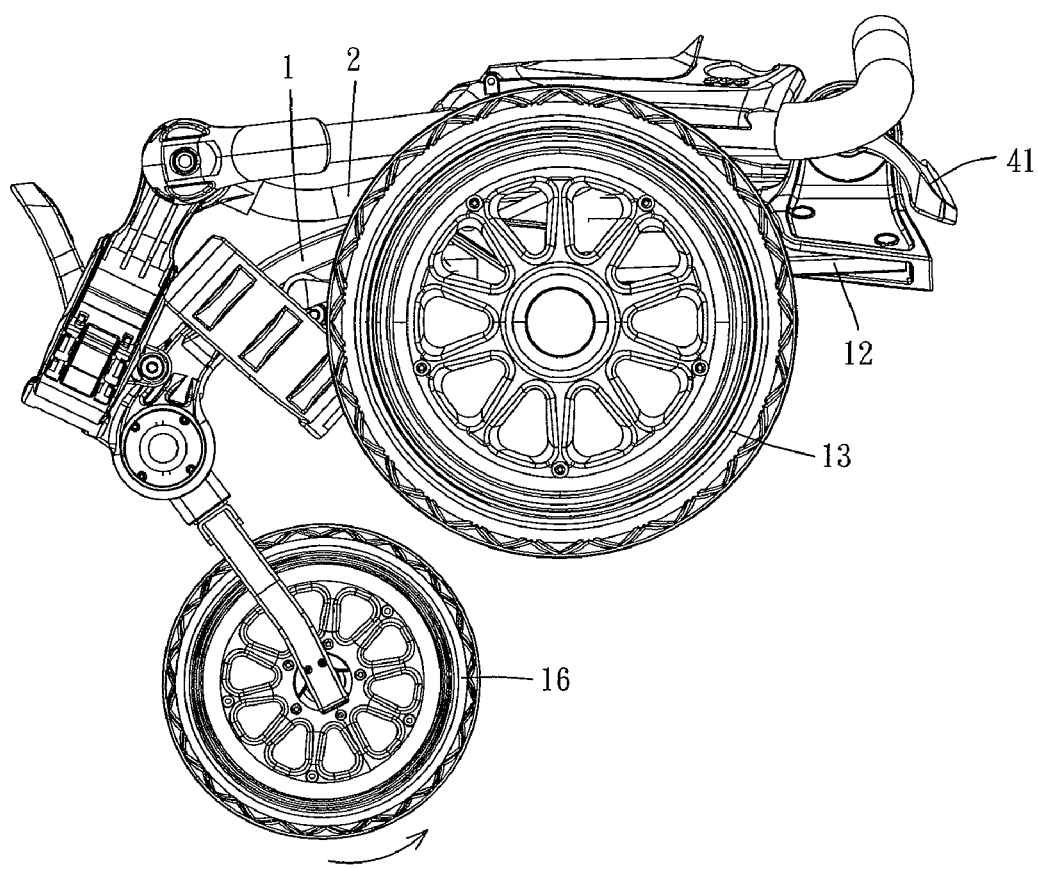
FIG. 8 is a schematic diagram of the motion of the folding for the front wheel according to the present invention.
Figure 9:
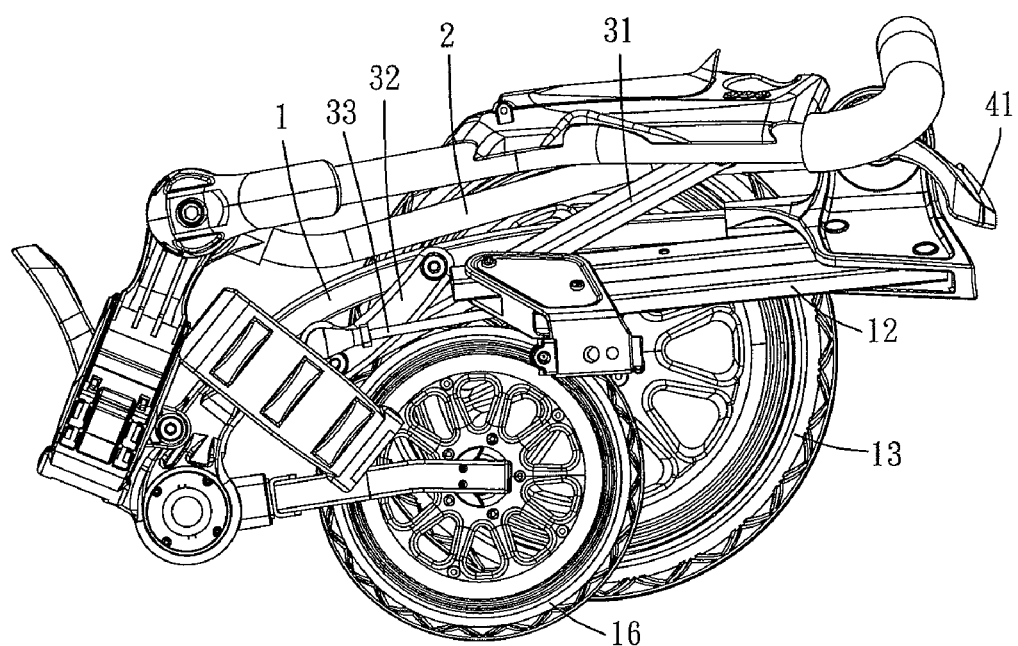
FIG. 9 is a schematic diagram of the side elevation of the motions of the complete folding according to the present invention.

Once intending for folding, the buckle 41 is first pulled up, and the upper cart stand 2 is pushed front and turned down, shown in FIGS. 6 & 7. The movable tooth disks 42 is pushed outward by the resilience of the spring 43 at the moment, enabling a separation from the rotator tooth disk 211, which makes the upper cart stand 2 drive the first linkage 31 through the rotator 21 and to push the second linkage 32. The second linkage 32 is therefore turning forward. Meanwhile, the second linkage 32 pulls the rear wheel frame 12 forward and turns inward through the third linkage 33, which enables the rear wheels 13 to undergo a forward and inward folding, followed by a pressing on the buckle 41 to immobilize the included angle formed by the upper cart stand 2 and the bottom cart stand 1. Lastly, the front wheel 16 is turned backward to somewhere below the bottom cart stand 1, to accomplish folding of the whole bag cart, shown in FIGS. 8 & 9.

On the contrary, once the golf bag cart is intended to unfold, the procedure starts by releasing the buckle 41 and turning the upper cart stand 2 up. Through the interaction among the first linkage 31, the second linkage 32 and the third linkage 33 with the rear wheel frame 12, the second linkage 32 is turned backward, to unfold the rear wheels 13. At the moment the positioning curved trenches 421 introduce constraint on the rotational angle of the upper cart stand 2, the buckle 41 has to be pressed again to lock the upper cart stand 2 and the bottom cart stand 1 to each other if the upper cart stand 2 has been turned to its limit. Finally, the front wheel 16 is turned forward to the outer side of the bottom of the bottom cart stand 1, to accomplish unfolding of the whole bag cart, shown in FIG. 2.

In short, the folding joint 4 of this invention is provided with a buckle 41 which enables the folding joint 4 to be released first before the upper cart stand 2 can be turned. Since the rotator tooth disk 211 has been separated from the movable tooth disks 42 and by the link between the linkage set 3 and the rear wheel frame 12, simultaneous unfolding or folding for the upper cart stand 2, the bottom cart stand 1 and the rear wheels 12 can be achieved. Followed by a locking to the folding joint 4, the upper cart stand 2 and the bottom cart stand 1 are ready to lock each other, to accomplish the purpose of unfolding or folding, shown in FIGS. 2 & 9, which substantially facilitates handiness of use.

From the aforesaid description, this invention features at least the following advantages and functions, which is more creative than the prior art:

1. The upper cart stand 2, the bottom cart stand 1 and the rear wheels 13 can be unfolded or folded simultaneously, which is truly handy in use.

2. During folding of the cart, the upper cart stand 2, the bottom cart stand 1 and the rear wheels 13 are locking to each other, and the cart is not only contracted in volume but handy carrying.

3. During unfolding of the cart and due to the supportive role of the folding joint 4 for having the cart fixed, there is no need for additional joints to be fixed, which is truly handy in use.

To sum up, the disclosed concrete structure of the exemplified embodiment of the present invention is not only unknown to the prior art, but surely can accomplish the expected objective and function, which is construed as absolutely novel and creative.

What is claimed is:

1. A golf bag cart foldable device comprising:
    a bottom cart stand having a link segment at a top, wherein two sides of the link segment are in pinned connection with two rear wheel frames each linking a rear wheel, with the bottom cart stand having a bag base at a bottom, wherein the bag base is connected to a front wheel frame, to link a front wheel;
    an upper cart stand in pinned connection with the link segment of said bottom cart stand through a rotator set up at a bottom of the upper cart stand;
    a linkage set comprising a plurality of linkages joined to said upper cart stand, said bottom cart stand and the rear wheel frames respectively, to form links between said upper cart stand and said bottom cart stand and between said upper cart stand and the rear wheel frames; and
    a folding joint, set up on the rotator of said upper cart stand, having a buckle enabling release of said folding joint first, followed by turning of said upper cart stand, and by the link between said linkage set and the rear wheel frame, simultaneous unfolding or folding of said upper cart stand, said bottom cart stand and the rear wheels is accomplished, and said folding joint being secured to have said upper cart stand and said bottom cart stand locked to each other, wherein said linkage set comprises:
    a first linkage in pinned connection with the rotator at a top of the rotator;
    a second linkage coupling to the first linkage on a first end of the second linkage and coupled to said bottom cart stand on a second end; and
    a third linkage coupling to the second linkage on one end of the third linkage and coupled to the rear wheel frame on another end of the third linkage.

2. A golf bag cart foldable device as in claim 1 wherein each of the two sides of the link segment is in pivotal pinned connection with the rear wheel frame, wherein the upper cart stand is in pivotal pinned connection with the link segment of said bottom cart stand, wherein the first linkage is a pivotal pinned connection with the rotator, wherein the first end of the second linkage is pivotally coupled to the first linkage, wherein the second end of the second linkage is pivotally coupled to the bottom cart stand, wherein the one end of the third linkage is pivotally coupled to the second linkage, and wherein the other end of the third linkage is pivotally coupled to the rear wheel frame.

3. A golf bag cart foldable device as in claim 1 wherein said buckle is in pinned connection with the two sides of the link segment and the rotator, with the buckle having bulges; and wherein said folding joint further comprises:
    two movable tooth disks coupling between the rotator and the buckle, wherein outer sides of the two movable tooth disks are provided with positioning curved trenches;
    two rotator tooth disks set up at outer sides of a bottom of the rotator; and
    two springs set up between the rotator and the movable tooth disks.

4. A golf bag cart foldable device as in claim 2 wherein said buckle is in pinned connection with the two sides of the link segment and the rotator, with the buckle having bulges; and wherein said folding joint further comprises:
    two movable tooth disks coupling between the rotator and the buckle, wherein outer sides of the two movable tooth disks are provided with positioning curved trenches;
    two rotator tooth disks set up at outer sides of a bottom of the rotator; and
    two springs set up between the rotator and the movable tooth disks.

5. A golf bag cart foldable device as in claim 4 wherein the upper cart stand is in pivotal pinned connection with the link segment of said bottom cart stand about an axis, wherein the bulges are concentric to and circumferentially spaced around the axis, wherein the positioning curved trenches are concentric to and circumferentially spaced around the axis and receive the bulges of the buckle.

6. A golf bag cart foldable device as in claim 3 wherein the upper cart stand is in pivotal pinned connection with the link segment of said bottom cart stand about an axis, wherein the bulges are concentric to and circumferentially spaced around the axis, wherein the positioning curved trenches are concentric to and circumferentially spaced around the axis and receive the bulges of the buckle.

7. A golf bag cart foldable device comprising:
   a bottom cart stand having a link segment at a top, wherein two sides of the link segment are in pinned connection with two rear wheel frames each linking a rear wheel, with the bottom cart stand having a bag base at a bottom, wherein the bag base is connected to a front wheel frame, to link a front wheel;
   an upper cart stand in pinned connection with the link segment of said bottom cart stand through a rotator set up at a bottom of the upper cart stand;
   a linkage set comprising a plurality of linkages joined to said upper cart stand, said bottom cart stand and the rear wheel frames respectively, to form links between said upper cart stand and said bottom cart stand and between said upper cart stand and the rear wheel frames; and
   a folding joint, set up on the rotator of said upper cart stand, having a buckle enabling release of said folding joint first, followed by turning of said upper cart stand, and by the link between said linkage set and the rear wheel frame, simultaneous unfolding or folding of said upper cart stand, said bottom cart stand and the rear wheels is accomplished, and said folding joint being secured to have said upper cart stand and said bottom cart stand locked to each other, wherein said buckle is in pinned connection with the two sides of the link segment and the rotator, with the buckle having bulges; and wherein said folding joint further comprises:
   two movable tooth disks coupling between the rotator and the buckle, wherein outer sides of the two movable tooth disks are provided with positioning curved trenches;
   two rotator tooth disks set up at outer sides of a bottom of the rotator; and
   two springs set up between the rotator and the movable tooth disks.

8. A golf bag cart foldable device as in claim 7 wherein the upper cart stand is in pivotal pinned connection with the link segment of said bottom cart stand about an axis, wherein the bulges are concentric to and circumferentially spaced around the axis, wherein the positioning curved trenches are concentric to and circumferentially spaced around the axis and receive the bulges of the buckle.

\* \* \* \* \*